(12) United States Patent
Stingu et al.

(10) Patent No.: US 12,053,055 B2
(45) Date of Patent: Aug. 6, 2024

(54) DUAL FUNCTION WIRELESS POWER AND THERMAL RECEIVER

(71) Applicant: Spark Connected LLC, Dallas, TX (US)

(72) Inventors: Petru Emanuel Stingu, Dallas, TX (US); Malek Ramezani, Farmers Branch, TX (US); Kenneth Moore, Dallas, TX (US); Yulong Hou, Shanghai (CN); Ruwanga Dassanayake, Dallas, TX (US)

(73) Assignee: Spark Connected LLC, Dallas, TX (US)

( * ) Notice: Subject to any disclaimer, the term of this patent is extended or adjusted under 35 U.S.C. 154(b) by 569 days.

(21) Appl. No.: 17/236,815

(22) Filed: Apr. 21, 2021

(65) Prior Publication Data

US 2021/0352997 A1     Nov. 18, 2021

Related U.S. Application Data

(60) Provisional application No. 63/025,787, filed on May 15, 2020.

(51) Int. Cl.
| | |
|---|---|
| *A43B 3/35* | (2022.01) |
| *H02J 50/12* | (2016.01) |
| *H04B 5/72* | (2024.01) |
| *H04B 5/79* | (2024.01) |
| *H05B 6/06* | (2006.01) |

(52) U.S. Cl.
CPC .............. *A43B 3/355* (2022.01); *H02J 50/12* (2016.02); *H04B 5/72* (2024.01); *H04B 5/79* (2024.01); *H05B 6/06* (2013.01)

(58) Field of Classification Search
CPC .......... A43B 3/355; H02J 50/12; H02J 50/80; H04B 5/72; H04B 5/79; H04B 5/0031; H04B 5/0037; H05B 6/06; H05B 6/105
See application file for complete search history.

(56) References Cited

U.S. PATENT DOCUMENTS

| | | |
|---|---|---|
| 3,376,578 A | 4/1968 | Sawyer |
| 3,735,231 A | 5/1973 | Sawyer |
| 3,906,185 A | 9/1975 | Gross et al. |
| 4,798,933 A | 1/1989 | Annovi |
| 4,860,183 A | 8/1989 | Maeda et al. |

(Continued)

OTHER PUBLICATIONS

Consumer Reports, "Wireless charging pad review: We tested four popular pads to see whether they really make your life easier", Wireless Charging Pad Reviews, Dec. 11, 2013, 5 pages.

(Continued)

*Primary Examiner* — Lincoln D Donovan
*Assistant Examiner* — Alex W Lam
(74) *Attorney, Agent, or Firm* — Slater Matsil, LLP

(57) ABSTRACT

In an embodiment, a method for heating a personal device using a wirelessly-powered heating device includes: wirelessly receiving power with a receiving coil of the wirelessly-powered heating device, the receiving coil located inside the personal device, where the receiving coil is coupled to a capacitor of the wirelessly-powered heating device to form a receiver resonant tank; and heating the personal device with heat produced by a resistance of the receiving coil, where the receiving coil functions as a receiver antenna and as a heat producing element.

28 Claims, 11 Drawing Sheets

(56) References Cited

U.S. PATENT DOCUMENTS

| | | | |
|---|---|---|---|
| 4,948,951 | A | 8/1990 | Balzano |
| 5,434,504 | A | 7/1995 | Hollis et al. |
| 5,498,948 | A | 3/1996 | Bruni et al. |
| 5,722,185 | A | 3/1998 | Vigneron |
| 6,175,169 | B1 | 1/2001 | Hollis, Jr. et al. |
| 6,184,651 | B1 | 2/2001 | Fernandez et al. |
| 6,445,093 | B1 | 9/2002 | Binnard |
| 6,657,164 | B1 | 12/2003 | Koch |
| 6,803,744 | B1 | 10/2004 | Sabo |
| 6,949,845 | B2 | 9/2005 | Oisugi et al. |
| 8,049,370 | B2 | 11/2011 | Azancot et al. |
| 8,193,769 | B2 | 6/2012 | Azancot et al. |
| 8,957,549 | B2 | 2/2015 | Kesler et al. |
| 9,590,444 | B2 | 3/2017 | Walley et al. |
| 9,800,191 | B2 | 10/2017 | Barsilai et al. |
| 9,853,441 | B2 | 12/2017 | Teggatz et al. |
| 10,054,622 | B2 | 8/2018 | Hernandez et al. |
| 10,079,090 | B2 | 9/2018 | Teggatz et al. |
| 10,168,443 | B2 | 1/2019 | Mangano et al. |
| 10,714,985 | B2 | 7/2020 | Stingu et al. |
| 10,847,997 | B1 | 11/2020 | Stingu et al. |
| 2006/0061323 | A1 | 3/2006 | Cheng et al. |
| 2008/0197126 | A1* | 8/2008 | Bourke .................. A43B 3/355 219/211 |
| 2010/0181841 | A1 | 7/2010 | Azancot et al. |
| 2010/0219183 | A1 | 9/2010 | Azancot et al. |
| 2010/0244579 | A1 | 9/2010 | Sogabe et al. |
| 2011/0050164 | A1 | 3/2011 | Partovi et al. |
| 2011/0062793 | A1 | 3/2011 | Azancot et al. |
| 2011/0074344 | A1 | 3/2011 | Park et al. |
| 2011/0121660 | A1 | 5/2011 | Azancot et al. |
| 2011/0227527 | A1 | 9/2011 | Zhu et al. |
| 2012/0032632 | A1 | 2/2012 | Soar |
| 2013/0049484 | A1 | 2/2013 | Weissentem et al. |
| 2013/0082651 | A1 | 4/2013 | Park et al. |
| 2013/0257172 | A1 | 10/2013 | Teggatz et al. |
| 2013/0264973 | A1 | 10/2013 | Garg et al. |
| 2013/0285601 | A1 | 10/2013 | Sookprasong et al. |
| 2013/0300204 | A1 | 11/2013 | Partovi |
| 2014/0080409 | A1 | 3/2014 | Frankland et al. |
| 2014/0184150 | A1 | 7/2014 | Walley |
| 2015/0115877 | A1 | 4/2015 | Arai et al. |
| 2015/0142348 | A1 | 5/2015 | Huang et al. |
| 2015/0249484 | A1 | 9/2015 | Mach et al. |
| 2015/0341087 | A1 | 11/2015 | Moore et al. |
| 2016/0149440 | A1 | 5/2016 | Staring et al. |
| 2017/0085133 | A1* | 3/2017 | Byun ..................... H02J 50/20 |
| 2017/0163100 | A1 | 6/2017 | Vocke et al. |
| 2019/0109498 | A1 | 4/2019 | Stingu et al. |
| 2019/0190320 | A1 | 6/2019 | Park |
| 2019/0319494 | A1 | 10/2019 | Park et al. |
| 2019/0334388 | A1 | 10/2019 | Van Wageningen et al. |

OTHER PUBLICATIONS

Digi-Key Electronics, "Inductive Versus Resonant Wireless Charging: A Truce May Be a Designer's Best Choice", Contributed By Digi-Key's North American Editors, Aug. 2, 2016, 8 pages.

Gao, Xiang, "Demodulating Communication Signals of Qi-Compliant Low-Power Wireless Charger Using MC56F8006 DSC", NXP Freescale Semiconductor Application Note, Document No. AN4701, Rev. 0, Mar. 2013, 21 pages.

Jansen, J. W., et al., "Overview of analytical models for the design of linear and planar motors", TU/e Eindhoven University of Technology, DOI: 10.1109/TMAG/2014.2328556, Jan. 1, 2014, 8 pages.

Johns, Bill et al., "Adapting Qi-compliant wireless-power solutions to low-power wearable products", Texas Instruments, High-Performance Analog Products, 2Q, 2014, Analog Applications Journal, 7 pages.

Kot, Thomas, "LC Sensor Rotation Detection with MSP430™ Extended Scan Interface (ESI)", Texas Instruments, Application Report, SLAA639, Jul. 2014, 33 pages.

Lynch, Brian T., "Under the Hood of a DC/DC Boost Converter", Texas Instruments, Power Supply Design Seminar, Paper SEM1800, Dallas, TX, USA, 2008-2009, 26 pages.

Rice, John, "Examining Wireless Power Transfer", Texas Instruments, 2014/2015 Power Supply Design Seminar, 38 pages.

Texas Instruments, "Industry-Leading Wireless Power Solutions The Most Widely Adopted in the Market", ti.com/wirelesspower, SLYT485C, 2013, 3 pages.

Texas Instruments, "Introduction to Wireless Power", QI WPC 1.1 compliant, 49 pages.

Waters, Benjamin et al., "Optimal Coil Size Ratios for Wireless Power Transfer Applications", IEEE, Jul. 28, 2014, 4 pages.

Wikipedia, "Electromagnetic coil", https://en.wikipedia.org/w/index.php?title=Electromagnetic_coil&oldid=776415501, Apr. 20, 2017, 6 pages.

Wikipedia, "Inductive charging", https://en.wikipedia.org/w/index.php?title=Inductive_charging&oldid=802615270, Sep. 27, 2017, 7 pages.

Wikipedia, "Qi (standard)", https://en.wikipedia.org/w/index.php?title=Qi_(standard)&oldid=803427516, Oct. 2, 2017, 5 pages.

Zens, "Zens First Worldwide to Introduce Built-in Wireless (Sub-)Surface Charger with Apple and Samsung Fast Charge", Mar. 23, 2018, 5 pages.

KANTHAL® Part of Sandvik Group, "KANTHAL® A-1 Resistance Heating Wire and Resistance Wire", Kanthal.com, Jul. 6, 2018, 3 pages.

Qi Wireless Power Consortium, "The Qi Wireless Power Transfer System Power Class 0 Specification Part 4: Reference Designs", Version 1.2.3., Feb. 2017, 336 pages.

* cited by examiner

PRIOR ART

— 1 —

DUAL FUNCTION WIRELESS POWER AND THERMAL RECEIVER

CROSS-REFERENCE TO RELATED APPLICATIONS

This application claims the benefit of U.S. Provisional Application No. 63/025,787, entitled "Dual Function Wireless Power and Thermal Receiver," and filed on May 15, 2020, which application is hereby incorporated herein by reference.

TECHNICAL FIELD

The present disclosure relates generally to an electronic system and method, and, in particular embodiments, to a dual function wireless power and thermal receiver.

BACKGROUND

Wireless charging systems are becoming ubiquitous in today's society. For example, many smartphones and wearables implement wireless charging technology. Ease of use, greater reliability, spatial freedom, reduced connectors and openings, and the possibility of hermetically sealing are among the benefits offered by wireless charging. Wireless charging standards allow for interoperability between different devices and manufacturers. Some wireless charging standards, such as the Qi standard from the Wireless Power Consortium, and standards promoted by the AirFuel alliance, are becoming widely adopted. The Qi standard uses inductive charging operating between 80 kHz and 300 kHz to wirelessly transmit power from a transmitter to a receiver. Standards promoted by the AirFuel alliance use resonant wireless charging operating at 6.78 MHz to wirelessly transmit power from a transmitter to a receiver.

FIG. 1 shows exemplary wireless charging system 100. Wireless charging system 100 includes a transmitter (TX) device 102 that includes a transmitting coil $L_{TX}$, and a receiver (RX) device 104 that includes a receiving coil $L_{RX}$. During wireless charging, wireless power transmitter 102 transmits wireless power to wireless power receiver 104 by causing current $I_{TX}$ to flow through TX LC tank 106. The magnetic field generated by transmitting coil $L_{TX}$ as a result of the flow of current $I_{TX}$ induces current $I_{RX}$ to flow through LC tank 108. Voltage $V_{RX}$ generated across terminals of RX LC tank 108 is rectified by rectifier 116 to produce rectified voltage $V_{RX\_DC}$.

SUMMARY

In accordance with an embodiment, a method for heating a personal device using a wirelessly-powered heating device includes: wirelessly receiving power with a receiving coil of the wirelessly-powered heating device, the receiving coil located inside the personal device, where the receiving coil is coupled to a capacitor of the wirelessly-powered heating device to form a receiver resonant tank; and heating the personal device with heat produced by a resistance of the receiving coil, where the receiving coil functions as a receiver antenna and as a heat producing element.

In accordance with an embodiment, a shoe includes: a sole; and a heating device configured to heat the shoe, the heating device including a resonant tank that includes a capacitor and a receiving coil, where the receiving coil is configured to function as a receiver antenna and as a heat producing element. In some embodiments, the heating device includes all electronic components of a wireless power receiver.

In accordance with an embodiment, a personal device includes: fabric that surrounds or partially surrounds the personal device; and a heating device including: a capacitor, and a receiving coil coupled to the capacitor to form a resonant tank, where the receiving coil is configured to function as a receiver antenna and as a heat producing element.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

Figure 1:
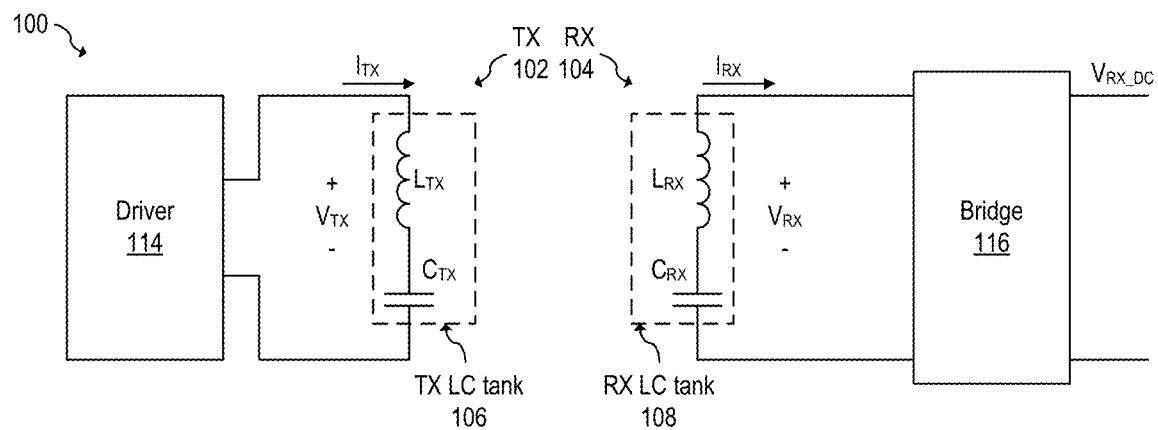
FIG. 1 shows an exemplary wireless charging system 100.

The making and using of the embodiments disclosed are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

Embodiments of the present invention will be described in a specific context, a heated shoe using wireless charging. Embodiments of the present invention may be used in other personal devices, such as socks, sandals, ski boots or any other device that has or can have a sole. Some embodiments may be used in other types of devices, such as gloves or other types of devices that can benefit from heat generation.

It is understood that the term wireless charging is not limited to the charging of a battery, but includes wireless power transmission generally, unless stated otherwise.

In an embodiment of the present invention, a heating device includes an insole of a shoe that includes a power transfer coil that is wirelessly powered by a wireless power transmitter. In some embodiments, the wireless power transmitter is located in a charging mat. In some embodiments, the wireless power transfer complies with a Qi standard, such as the Qi standard that corresponds to version 1.0, 1.1, 1.2, 1.2.3 or 1.2.4 of the Qi specification. Some embodiments may comply with other versions of the Qi specification or with standards promoted by the AirFuel alliance.

In some embodiments, the magnitude of the receiver current $I_{RX}$ can be controlled by the transmitter driver using, e.g., conventional methods, such as changing the duty cycle and/or frequency of the signal powering the transmitter LC tank, for example.

In an embodiment of the present invention, a resistive coil is placed on an insole of a shoe. The resistive coil may be implemented, e.g., with a far infrared film, polymer PTC, ceramic, thick film, or other heating element technology.

The current flowing through the resistive coil produces heat, e.g., using the principle of ohmic heating, which is based on:

$$P \propto I^2 R \quad (1)$$

where P is the power associated with the heat generated, R is the resistance, and I is the current flowing through the resistance. The power dissipated by the resistance associated with the resistive coil produces heat, e.g., in accordance with Equation 1.

In some embodiments, the heating device is capable of keeping the inside of the shoe at a temperature that is, e.g., 50° F. warmer than the temperature outside of the shoe. Other temperature differences (between the inside of the shoe and the outside of the shoe may also be possible (such as differences higher than 50° F., such as 60° F., 70° F., or higher, or lower than 50° F., such as 30° F., 20° F. or lower).

In some embodiments, the temperature inside the shoe, and hence the temperature exposed to the foot of a user can be regulated, to a target temperature such as 75° F. Other target temperatures, such as target temperatures higher than 75° F., such as 78° F., 80° F. or higher, or lower than 75° F., such as 72° F., 69° F., or lower, are also possible. In some embodiments, the temperature regulation exhibits hysteresis (e.g., of 0.5° F., 1° F., 5° F. or different).

In some embodiments, heat produced by the resistance of the receiving coil causes the surface of insole 202 to increase in temperature by at least 1° C., such as by at least 5° C., such as by 20° C., 40° C., or more.

Figure 2A:
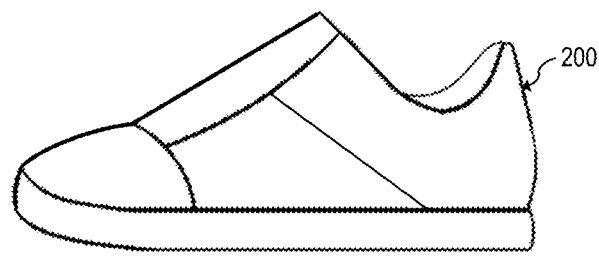
FIGS. 2A and 2B show a shoe and an insole of the shoe, respectively, according to an embodiment of the present invention.
Figure 2B:
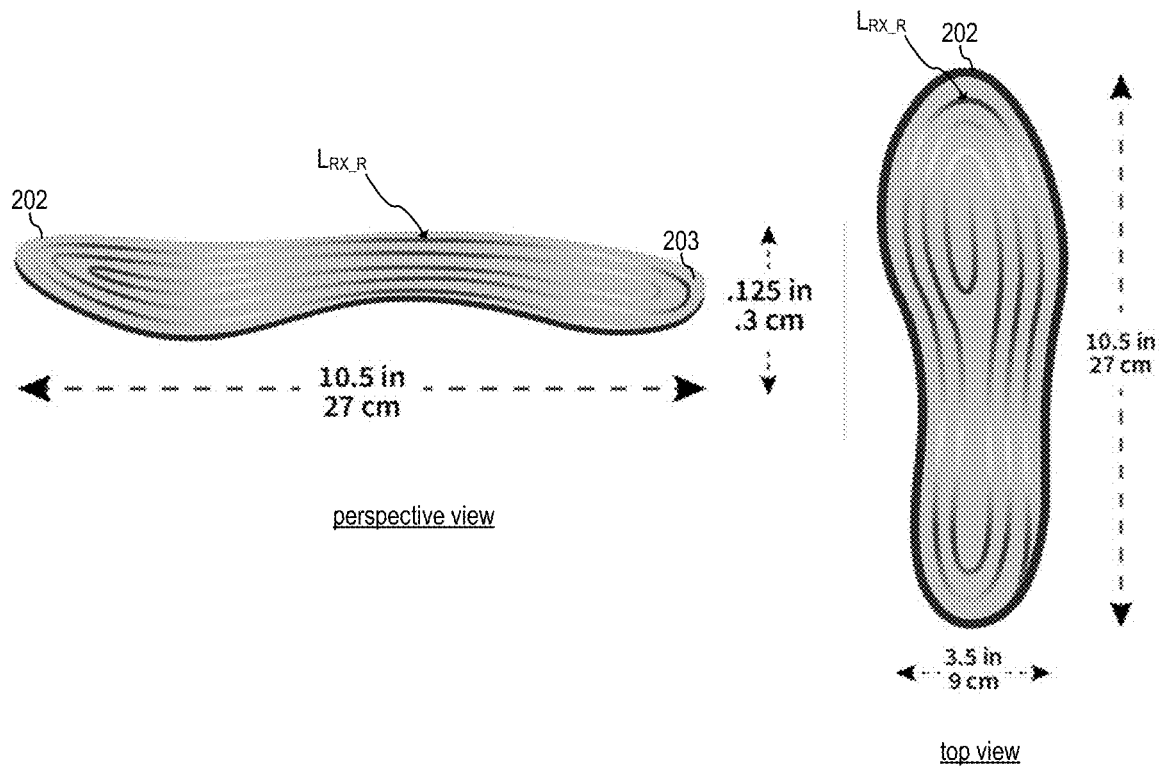

FIGS. 2A and 2B show shoe 200 and insole 202 of shoe 200, respectively, according to an embodiment of the present invention. Insole 202 includes resistive coil $L_{RX\_R}$.

As shown in FIG. 2B, resistive coil $L_{RX\_R}$ may be implemented at a surface of insole 202 and may include a plurality of turns. It is understood that the specific dimensions and shape shown in FIG. 2B are exemplary, and that other dimensions and shapes may also be implemented. For example, in some embodiments, resistive coil $L_{RX\_R}$ may have a shape that substantially follows the contour of the insole of the shoe (e.g., as shown in FIG. 2B). In some embodiments, the shape of resistive coil $L_{RX\_R}$ may be square or ellipsoidal. Other shapes are also possible.

In some embodiments, resistive coil $L_{RX\_R}$ may be used for generating heat to increase the temperature, e.g., inside shoe 200.

The exterior of shoe 200 may be implemented in any way known in the art. For example, in some embodiments, shoe 200 may include fabric, leather, rubber, or any other suitable material that surrounds or partially surrounds insole 202.

Figure 3:
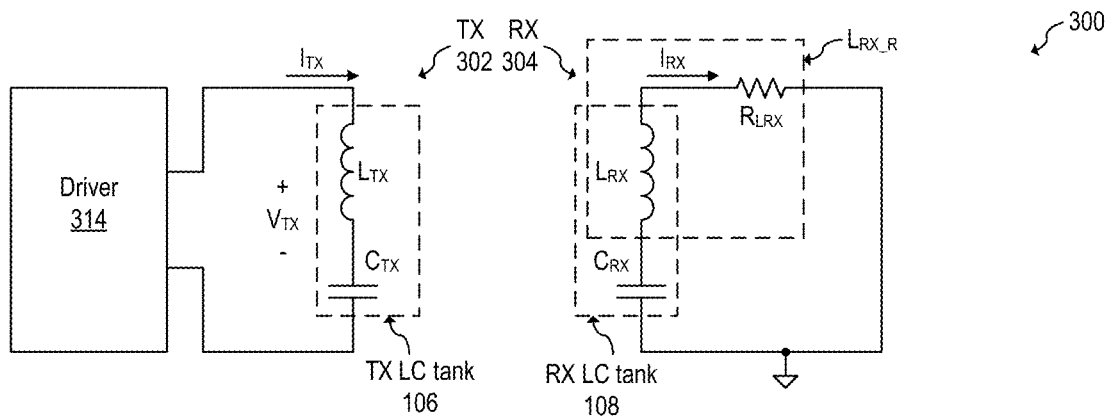
FIGS. 3 and 4 show schematic diagrams of wireless power system, according to embodiments of the present invention.

In some embodiments, resistive coil $L_{RX\_R}$ may cooperate with a capacitor to form a resonant tank for wirelessly receiving power from a wireless power transmitter, e.g., located outside shoe 200. For example, FIG. 3 shows a schematic diagram of wireless power system 300, according to an embodiment of the present invention. Wireless charging system 300 include wireless power transmitter 302 and wireless power receiver 304. Wireless power receiver 304 uses the same resistive coil $L_{RX\_R}$ for producing heat and for receiving power from wireless power transmitter 302. In some embodiments, insole 202 includes wireless power receiver 304.

During normal operation, wireless power transmitter 302 generates current $I_{TX}$ to flow through TX LC tank 106. The magnetic field generated by transmitting coil $L_{TX}$ as a result of the flow of current $I_{TX}$ induces current $I_{RX}$ to flow through LC tank 108. Current $I_{RX}$ flowing through resistor $R_{LRX}$ causes heat to be generated, e.g., in accordance with Equation 1.

As shown in FIG. 3, the receiving coil for receiving wireless power is implemented as a resistive coil $L_{RX\_R}$ that has an inductance $L_{RX}$ and a resistance $R_{LRX}$. For example, in some embodiments, the resistive coil $L_{RX\_R}$ is implemented with a resistive wire having resistance $R_{LRX}$ that is looped around to exhibit inductance $L_{RX}$. In some embodiments, insole 202 is, or is part of, a heating device that produces heat, e.g., for increasing the temperature inside shoe 200, using resistive coil $L_{RX\_R}$.

In some embodiments, the power dissipated by resistance $R_{LRX}$ produces 100% (assuming an ideal capacitor $C_{RX}$) or near 100% of the heat produced by the heating device. In some embodiments (e.g., as discussed below with respect to FIGS. 4A and 4B), the heat generated by $R_{LRX}$ may be less than 100% of the heat generated by the heating device.

In some embodiments, the resistive coil $L_{RX\_R}$ may be implemented, for example, with a heater wire, which may be made, for example, with a Kanthal alloy (FeCrAl). Other materials may also be used. In some embodiments, the conductor used to implement the resistive coil may be different than a wire, such as a trace in a printed circuit board (PCB) or flexible printed circuit board (FPC), for example.

In some embodiments, the resistivity of the conductor used to implement resistive coil $L_{RX\_R}$ is between 1Ω and 5Ω per meter. Conductors with other resistivities, such as higher than 5Ω per meter or lower than 1 Ω per meter may also be used.

As a non-limiting example, an embodiment that uses a heater wire may exhibit a total resistance $R_{LRX}$ associated with resistive coil $L_{RX\_R}$, as implemented in insole 202, between 1Ω and 7.5Ω.

Driver 314 may be implemented with a full-bridge and may operate at switching frequencies from 80 kHz to 300 kHz. In some embodiments, driver 314 may operate the full-bridge at a frequency of about 6.78 MHz. Other frequencies may also be used. In some embodiments, driver 314 may be implemented with class-E and class-D amplifiers.

In some embodiments, wireless power transmitter 302 may be implemented in a conventional manner. In some embodiments wireless power transmitter 302 may comply with the Qi standard (e.g., version 1.0, 1.1, 1.2, 1.2.3 or 1.2.4). In some embodiments wireless power transmitter 302 may comply with standards promoted by the AirFuel alliance (e.g., versions BSS 4.0).

Figure 4:
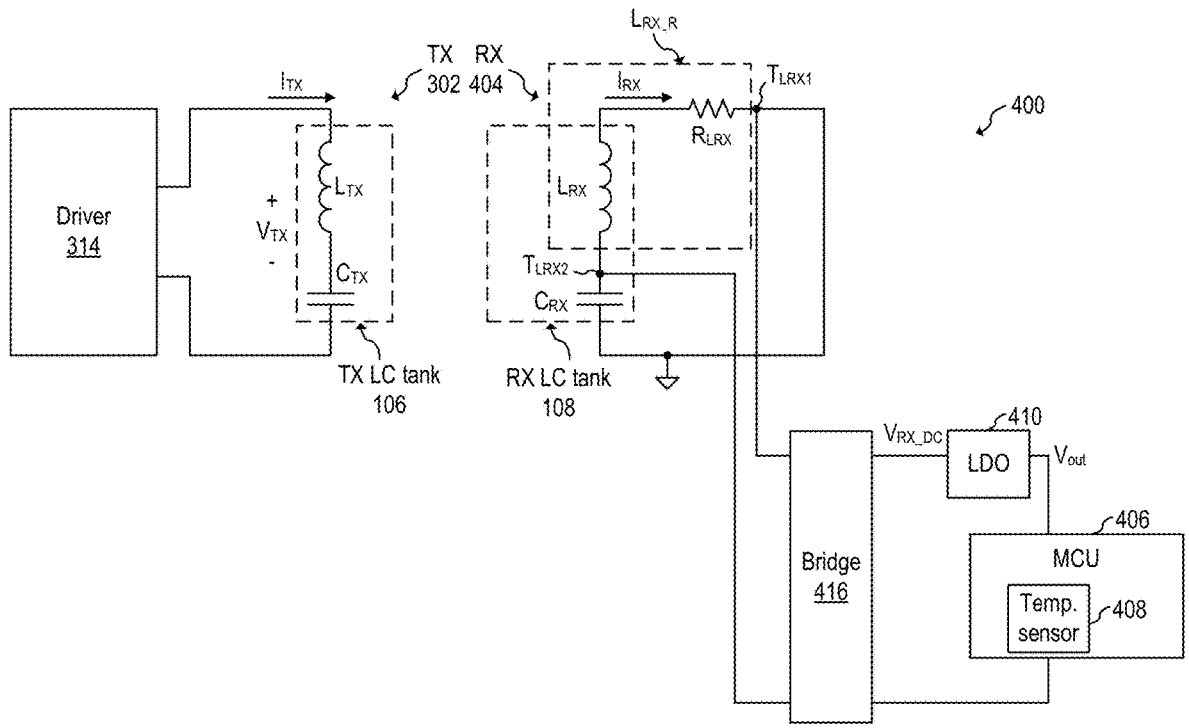

In some embodiments, a microcontroller may be implemented in shoe 200 (e.g., in the sole of shoe 200), to monitor temperature and report the monitored temperature to wireless power transmitter 302, e.g., for heat regulation purposes. For example, FIG. 4 shows a schematic diagram of wireless charging system 400, according to an embodiment of the present invention. Wireless charging system includes wireless power transmitter 302 and wireless power receiver 404. Wireless power receiver 404 includes microcontroller 406, power converter 410, and rectifier 416. In some embodiments, insole 202 includes wireless power receiver 404.

During normal operation, rectifier 416 rectifies the voltage across resistive coil $L_{RX\_R}$ to produce rectified voltage $V_{RX\_DC}$. Power converter 410 produces regulated voltage $V_{out}$ from rectified voltage $V_{RX\_DC}$ to power microcontroller 406.

Microcontroller 406 may sense the temperature inside show 200 by using temperature sensor 408 located inside shoe 200. In some embodiments, microcontroller 406 may transmit data associated with the sensed temperature to wireless power transmitter 302, e.g., using conventional in-band communication. In some embodiments, wireless power transmitter 302 may regulated the transmitted power (e.g., by regulating voltage $V_{TX}$ and/or current $I_{TX}$ based on the temperature data received from wireless power receiver 404 (e.g., to achieve a desired temperature inside show 200).

Rectifier 416 may be implemented in any way known in the art. For example, in some embodiments, rectifier 416 may be implemented as a passive bridge rectifier. In some embodiments, rectifier 416 may be implemented as a synchronous rectifier.

As shown in FIG. 4, power converter 410 may be implemented as an LDO. In some embodiments, power converter 410 may be implemented as a switched-mode power supply (SMPS) of the buck type. Other power converter topologies, such as a switching boost or buck boost converter, flyback converter, and a power converter that includes more than one converter stages (e.g., an SMPS of the buck type followed by an LDO) may also be used.

Microcontroller 406 may be implemented as a generic microcontroller. In some embodiments, controller 406 may be implemented as a generic processor. In some embodiments, a custom application specific integrated circuit (ASIC) may implement controller 406. Other implementations are also possible.

Temperature sensor 408 may be implemented inside a microcontroller IC. In some embodiments, temperature sensor 408 may include a thermistor that is connected to a terminal (e.g., a pin) of microcontroller 406. Other implementations are also possible.

Figure 5:
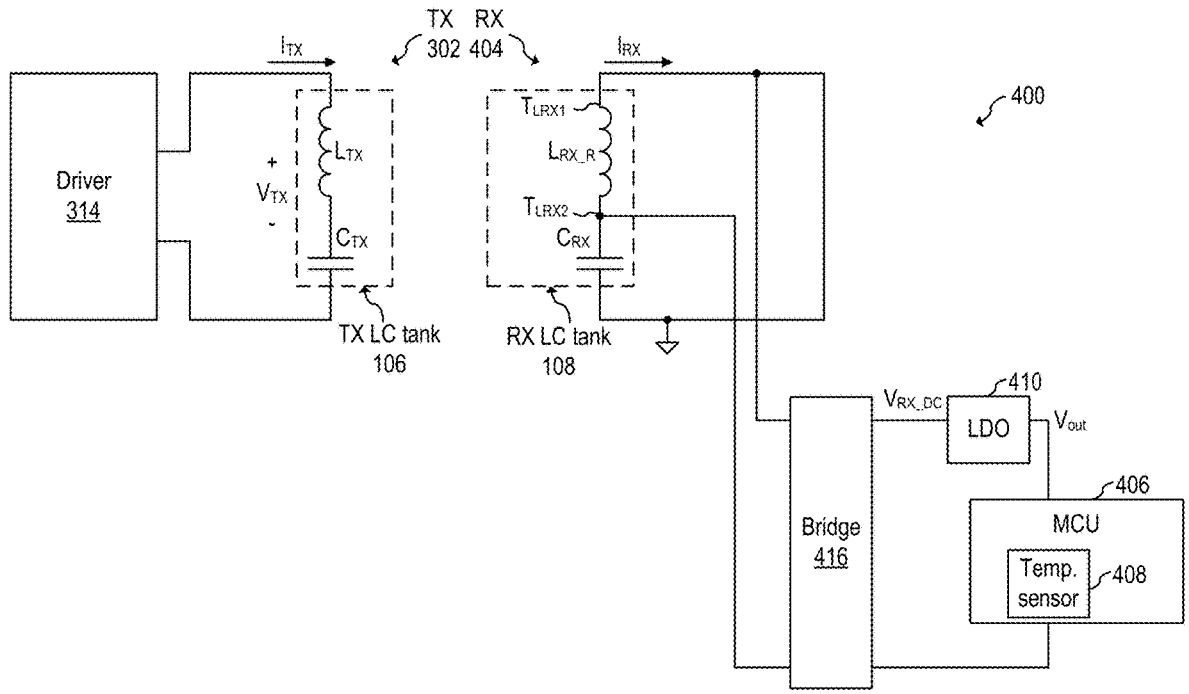
FIG. 5 shows a schematic diagram of the component implementation of the wireless charging system of FIG. 4, according to an embodiment of the present invention.

In some embodiments, resistance $R_{LRX}$ represents the resistance of the resistive coil and is not an actual resistor. For example, FIG. 5 shows a schematic diagram of the component implementation of wireless charging system 400, according to an embodiment of the present invention. Other implementations, such as using SMPS to power the MCU, may also be used.

As shown in FIGS. 4 and 5, resistive coil $L_{RX\_R}$ includes terminals $T_{LRX1}$ and $T_{LRX2}$.

As shown in FIGS. 4 and 5, some embodiments may include elements additional to the receiver LC tank 108 that may generate some heat, such as an LDO (e.g., 410) and a microcontroller (e.g., 406). In such embodiments, a substantial portion of the heat of the heating device, such as greater than 90% or greater than 95%, or greater than 98%, for example, is generated by the resistance $R_{LRX}$ associated with the resistive coil $L_{RX\_R}$.

In some embodiments, microcontroller 406 uses temperature sensor 408 (e.g., integrated in the IC, or using an external thermistor) to monitor the temperature of the sole (e.g., at a surface of insole 202). Information about the value of the temperature is then transmitted back to wireless power transmitter 302 so that wireless power transmitter 302 can adjust the intensity of the wireless power transmission to regulate the temperature of the sole to a desired value.

Figure 6:
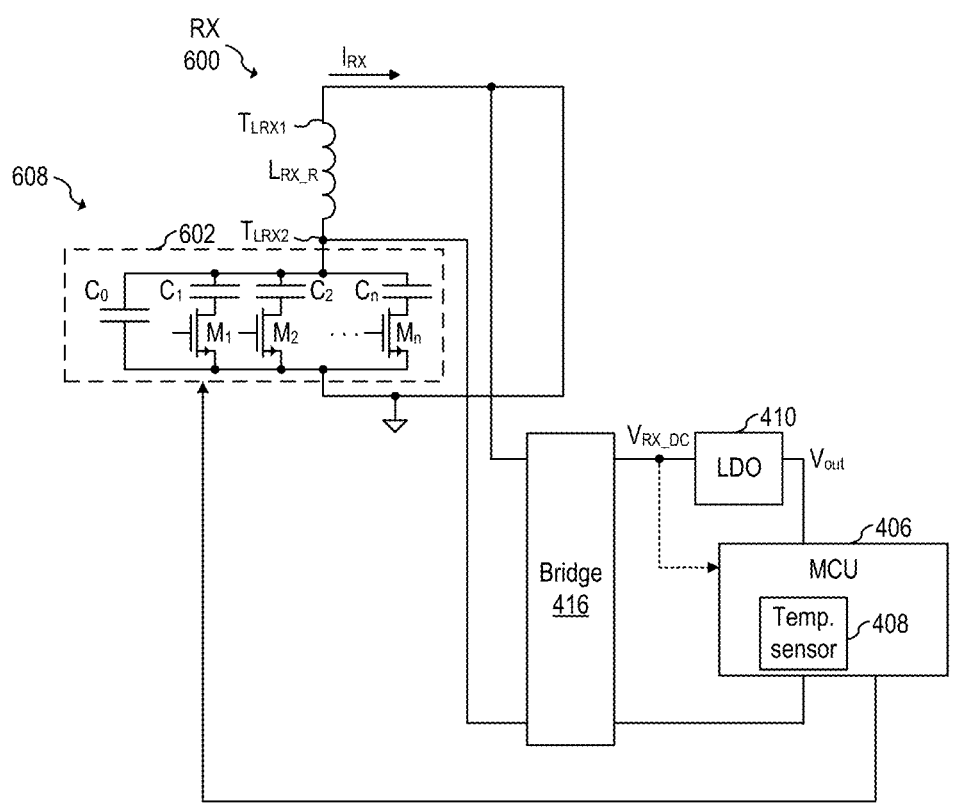
FIG. 6 shows a wireless power receiver, according to an embodiment of the present invention.

In some embodiments, the temperature control (e.g., inside shoe 200) is fulfilled on the receiver RX side. For example, in some embodiments, temperature control is achieved on the receiver RX side by controlling (varying) the capacitance of capacitor $C_{RX}$ to change the quality factor of the receiver LC tank and thus change the current $I_{RX}$, thereby controlling the heat generated by $R_{LRX}$. In some embodiments, the varying capacitor $C_{RX}$ is implemented by using a plurality of capacitors in series and/or in parallel, and which can be connected and disconnected to the receiver LC tank, e.g., by microcontroller 406. For example, FIG. 6 shows wireless power receiver 600, according to an embodiment of the present invention. Wireless power receiver 404 may be implemented as wireless power receiver 600.

As shown, receiver LC tank 608 includes capacitor bank 602 and resistive coil $L_{RX\_R}$. capacitor bank 602 includes n capacitors ($C_1$ to $C_n$) respectively coupled in series with n transistors ($M_1$ to $M_n$), where n is higher or equal to 1, such as 2, 3, 4, or more.

In some embodiments, an additional capacitor $C_0$ is implemented. In some embodiments, microcontroller 406 turns on and off transistors one or more of transistors $M_1$ to $M_n$ to change (e.g., increase or decrease) the quality factor of the receiver LC tank 608 based on the output of temperature sensor 408. For example, in some embodiments, when the output of temperature sensor 408 is indicative of a temperature higher than a target temperature, microcontroller 406 may turn on and/or off one or more of transistors $M_1$ to $M_n$ to cause a decrease in quality factor of the receiver LC tank 608 (move the resonance frequency of receiver LC tank 608 away from the switching frequency of wireless power transmitter 302) and cause a corresponding decrease in power dissipated by resistive coil $L_{RX\_R}$.

In some embodiments, when the output of temperature sensor 408 is indicative of a temperature lower than the target temperature, microcontroller 406 may turn on and/or off one or more of transistors $M_1$ to $M_n$ to cause an increase in quality factor of the receiver LC tank 608 (move the resonance frequency of receiver LC tank 608 towards the switching frequency of wireless power transmitter 302) and cause a corresponding increase in power dissipated by resistive coil $L_{RX\_R}$.

In some embodiments, microcontroller 406 may use voltage $V_{RX\_DC}$ (e.g., RMS value) as indicative of the magnitude of power dissipation of resistive coil $L_{RX\_R}$ and may turn on and/or off one or more of transistors $M_1$ to $M_n$ based on voltage $V_{RX\_DC}$ to adjust the quality factor of quality factor of the receiver LC tank 608 and regulate the temperature inside show 200.

In some embodiments, the frequency of change in the capacitance associated with capacitor bank 602 may be lower (e.g., substantially lower) than 1 kHz. By modifying the capacitance value associated with capacitor bank 602 at frequencies lower than 1 kHz, some embodiments advantageously avoid interfering with conventional in-band communications, e.g., performed in accordance with the Qi standard (e.g., version 1.0, 1.1, 1.2, 1.2.3 or 1.2.4).

In some embodiments, the communication between microcontroller 406 and a controller (not shown) of the wireless power transmitter (e.g., 302) is done via in-band communication (e.g., by modulation the current $I_{RX}$ using load modulation, e.g., in a known manner). In some embodiments, the MCU may include or be coupled to a Bluetooth transmitter or other type of wireless transmitter for transmitting information of the value of the temperature to the wireless power transmitter.

In some embodiments, capacitor bank 602 may be used to perform load modulation at a frequency between 1 kHz to 2 kHz to communicate with wireless power transmitter (e.g., 302) using a conventional in-band communication protocol (e.g., according to the Qi standard, e.g., version 1.0, 1.1, 1.2, 1.2.3 or 1.2.4) data indicative of the temperature measured by temperature sensor 406. Thus, in some embodiments, microcontroller 406 may adjust the capacitance associated with capacitor bank 620 at a frequency lower than 1 kHz (e.g., at 100 Hz, 20 Hz, 1 Hz, 0.1 Hz, or lower) for adjusting the temperature of show 200, and may adjust the capacitance associated with capacitor bank 620 at a frequency between 1 kHz and 2 kHz to communicate with wireless power transmitter 302. Since thermal time constants are typically small, changing the capacitance associated with capacitor bank 620 at a frequency equal to or higher than 1 kHz may not interfere with the regulation of temperature inside show 200. By using the same capacitor bank 602 for thermal controller and for in-band communication, some embodiments advantageously avoid using an additional capacitor bank for in-band communication purposes, which may reduce the form factor and/or cost the wireless power receiver.

Figure 7:
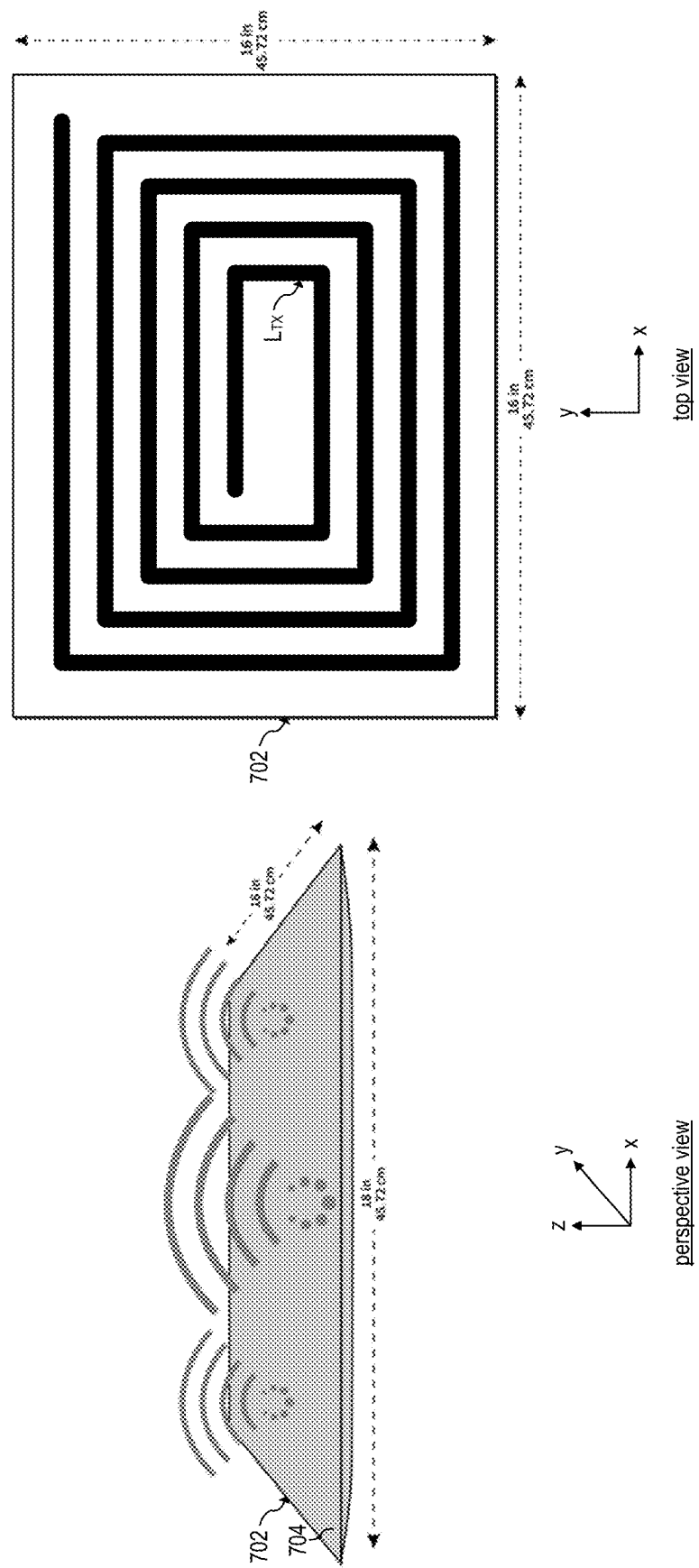
FIG. 7 shows a mat that includes the wireless power transmitter of FIG. 3 for transmitting wireless power to heat a pair of shoes, according to an embodiment of the present invention.

FIG. 7 shows mat 702 that includes wireless power transmitter 302 for transmitting wireless power to heat a pair of shoes, according to an embodiment of the present invention.

As shown in FIG. 7, in some embodiments, the transmitting coil $L_{TX}$ (also referred to as transmitting antenna or transmitter antenna) of wireless power transmitter 302 may have a square shape. Other shapes, such as a circular shape, may also be used. In some embodiments, mat 702 may include a plurality of transmitting coils $L_{TX}$, such as 2, 3, or more.

In some embodiments, mat 702 implements transmitting coil $L_{TX}$ at the top surface 704 of mat 702. In some embodiments, mat 702 implements transmitting coil $L_{TX}$ underneath the top surface 704 of mat 702.

In some embodiments, transmitting coil $L_{TX}$ is implemented with traces in a PCB. Other implementations are also possible.

In some embodiments, transmitting coil $L_{TX}$ occupies most of the area of mat 702, such that a uniform field is generated for most of the area of mat 702 (except at the edges of mat 702, or near the edges of mat 702, in which the field may curve).

In some embodiments, transmitter 302 may operate as a resonant charger (using about 6.78 MHz frequency for wireless power transmission). A person skilled in the art would know how to select the values of the capacitance and inductance of the transmitter and receiver LC tank for a particular implementation.

Figure 8:
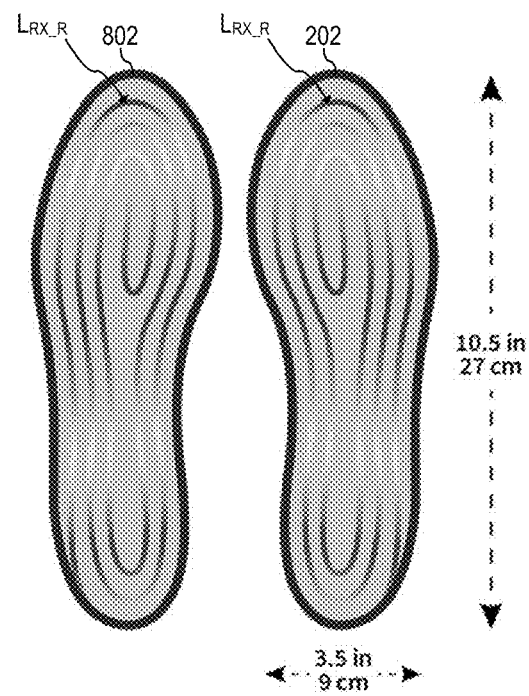
FIG. 8 shows symmetric insoles, according to an embodiment of the present invention.

In some embodiments, each shoe 200 of a pair of shoes implement symmetrical receiver coils $L_{RX}$, e.g., and, e.g., identical circuits, such as shown in FIGS. 3-6. FIG. 8 shows symmetric insoles 202 and 802, according to an embodiment of the present invention. As shown, each of insoles 202 and 802 include respective resistive coil $L_{RX\_R}$. In some embodiments, the resistances $R_{LRX}$ of resistive coils $L_{RX\_R}$ of insoles 202 and 802 are equal.

In some embodiments, a pair of shoes (e.g., a pair of shoes 200) designed to operate with a resonant wireless power transmitter may avoid using a ferrite core, which may advantageously allow for flexible formability of the sole.

In some embodiments, a mat (e.g., 702) implemented with wireless power transmitter 302 operating as a resonant charger at 6.78 MHz transmits wireless power to a pair of shoes (e.g., 200) having a sole capable of producing heat (e.g., 202, 802) and each implementing (e.g., identical) respective wireless power receiver (e.g., 304, 404, 600). In some embodiments, the resonant charger implementation is capable of wirelessly transmitting power to the pair of shoes for up to 40 mm from the surface of the mat (in the z-axis). For example, in some embodiments, top surface 704 of mat 702 is at a vertical distance (z-axis) of 40 mm from top surface 203 of insole 202.

Figure 9:
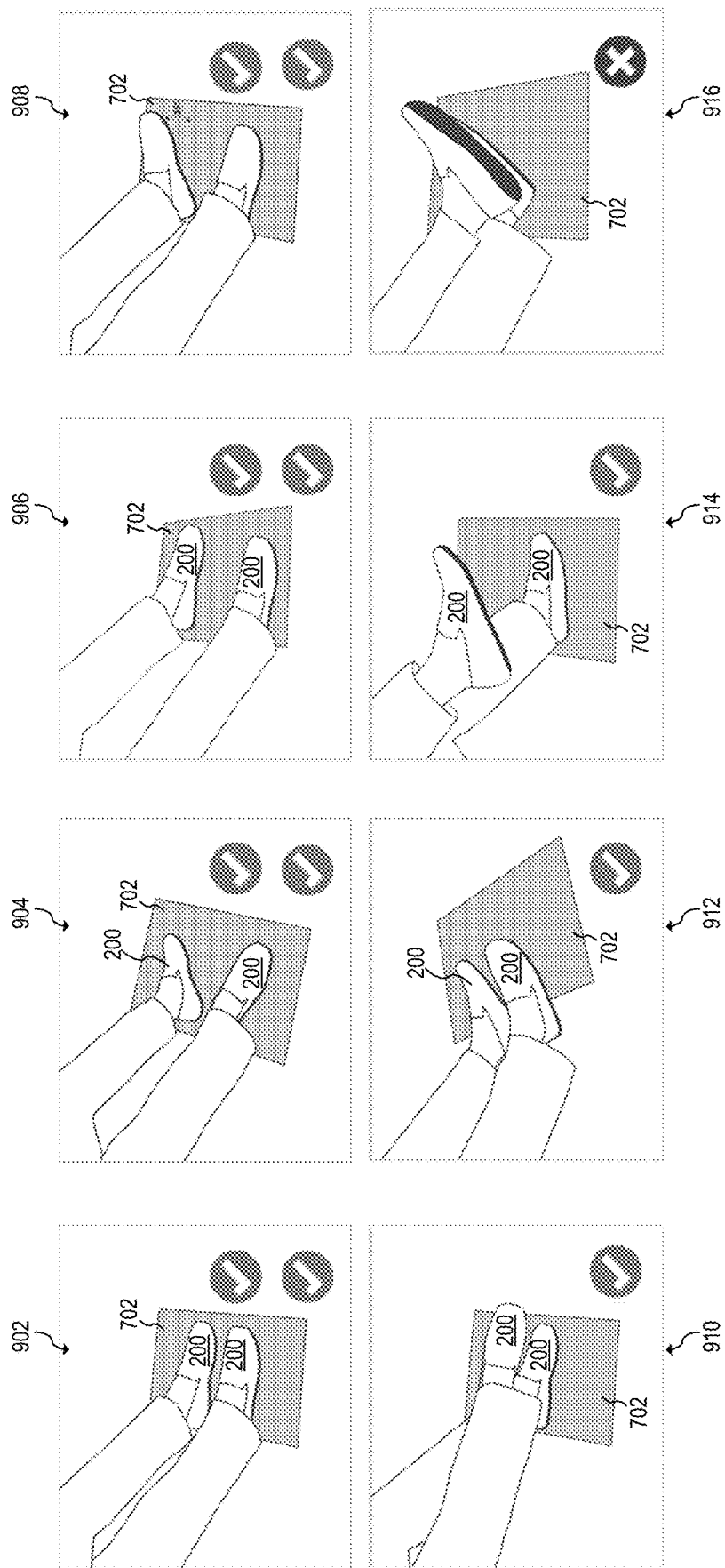
FIG. 9 shows examples of possible positions of a pair of shoes from FIG. 2 designed to operate with a resonant wireless power transmitter, with respect to the wireless charger mat of FIG. 7, according to an embodiment of the present invention.

FIG. 9 shows examples of possible positions of a pair of shoes 200 designed to operate with a resonant wireless power transmitter, with respect to wireless charger mat 702, according to an embodiment of the present invention.

As shown in FIG. 9, wireless power transmitter 302, e.g., as implemented in mat 702, is capable of simultaneously transmitting power to both shoes 200 in a variety of different positions, as illustrated by positions 902, 904, 906, and 908 (denoted by the double check mark). As shown by positions 902, 904, 906, and 908, some embodiments allow for heating shoes 200 in a variety of position. In some embodiments, such flexibility of position is made possible by the uniformity of the field generated by the wireless power transmitter 302 operating in resonant mode.

As illustrated by positions 910, 912, and 914 (denoted with a single check mark), some positions may cause the heating device (e.g., 202, 802) of the shoe(s) 200 to operate while receiving partial wireless power, such as when the heating device of a single shoe 200 receives full power while the heating device of the other shoe 200 does not receive any power (e.g., as illustrated by positions 910 and 914), or, e.g., when the heating devices of one or both shoes are located near the edge of the mat, such as shown by position 912, in which the heating device of both shoes 200 receive partial wireless power.

In some embodiments, when no shoe is in a location in for receiving power, wireless power transmitter 302 may stop power transmission (denoted by the X in position 916). In some embodiments, when the shoes are in a position in which some but not all shoes can receive power (such as shown in positions 910 and 914), wireless power transmitter 302 stops the wireless power transmission since not all shoes are in a location capable of receiving power from the wireless power transmitter 302 of mat 702. Thus, some embodiments may advantageously avoid discomfort to the user, which may be caused by having one shoe heated and the other shoe not heated.

In some embodiments, wireless power transmitter 302 may transmit wireless power to any shoe 200 that is in a charging location to heat it regardless of whether the other shoe 200 can receive power. In such embodiments, wireless power charger 302 may transmit power to at least one shoe in the positions illustrated in positions 902, 904, 906, 908, 910, 912, and 914, but is off in positions 916.

Figure 10:
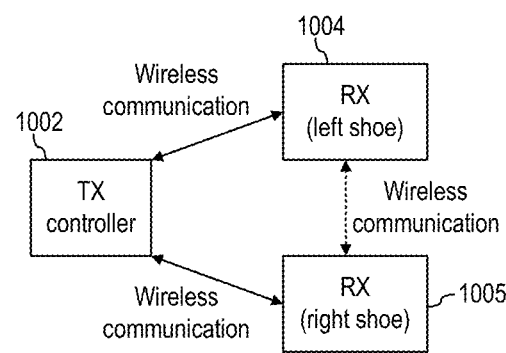
FIG. 10 shows a schematic diagram of the wireless communication between a transmitter controller of the wireless power transmitter of FIG. 3 and wireless power receivers of a pair of shoes, according to an embodiment of the present invention.

FIG. 10 shows a schematic diagram of the wireless communication between transmitter controller 1002 of wireless power transmitter 302 and wireless power receivers 1004 and 1005 of the pair of shoes 200, according to an embodiment of the present invention. In some embodiments, wireless power receiver 1004 may be implemented as wireless power receivers 304, 404 or 600. In some embodiments, wireless power receiver 1005 may be implemented as wireless power receivers 304, 404 or 600. In some embodiments, wireless power receivers 1004 and 1005 are identical.

As shown in FIG. 10, in some embodiments, wireless power receivers 1004 and 1005 of the pair of shoes communicate with transmitter controller 1002, e.g., to send information indicative of the temperature inside their respective shoes 200. In some embodiments, each receiver 1004 and 1005 (e.g., from each shoe) may adjust the intensity of power received (e.g., by changing the resonant frequency of the receiver LC tank 608, e.g., by connecting and/or disconnecting capacitors in parallel and/or in series to the capacitor $C_{RX}$ of the receiver LC tank) based on the value of the temperature measured (e.g., by using the respective microcontroller 406).

In some embodiments, transmitter controller 1002 communicates with each wireless power receiver (1004, 1005) to, e.g., configure the respective microcontroller 406. For example, in some embodiments, a user may control with an application, such as a mobile application installed in a smartphone or tablet, or an application installed in a PC, the configuration of the heated shoes. For example, a user may control the temperature of each shoe (e.g., independently), e.g., via the Internet. Once the user inputs the desired temperature of each shoe, transmitter controller 1002 may configure the target temperature for each shoe in microcontrollers 406 of wireless power receivers 1004 and 1005.

In some embodiments, the communication between wireless power transmitter 302 and each wireless power receiver 1004 and 1005 is performed in-band using the same wireless charging coils ($L_{TX}$, $L_{RX\_R}$) of wireless power transmitter 302 and wireless power receivers 1004 and 1005. In some embodiments, the communication between wireless power transmitter 302 and each wireless power receiver 1004 and 1005 is performed using other wireless technologies, such as Bluetooth, or WiFi, for example.

In some embodiments, transmitter controller 1002 controls more than one transmitting coil $L_{TX}$, e.g., via a respective driver 314. In other embodiments, a single transmitting coil $L_{TX}$ is controlled by transmitter controller 1002.

In some embodiments, each of wireless power receivers 1004 and 1005 may communicate with each other in a wireless manner using a wireless technology such as Bluetooth or WiFi, e.g., as shown in FIG. 10.

Figure 11:
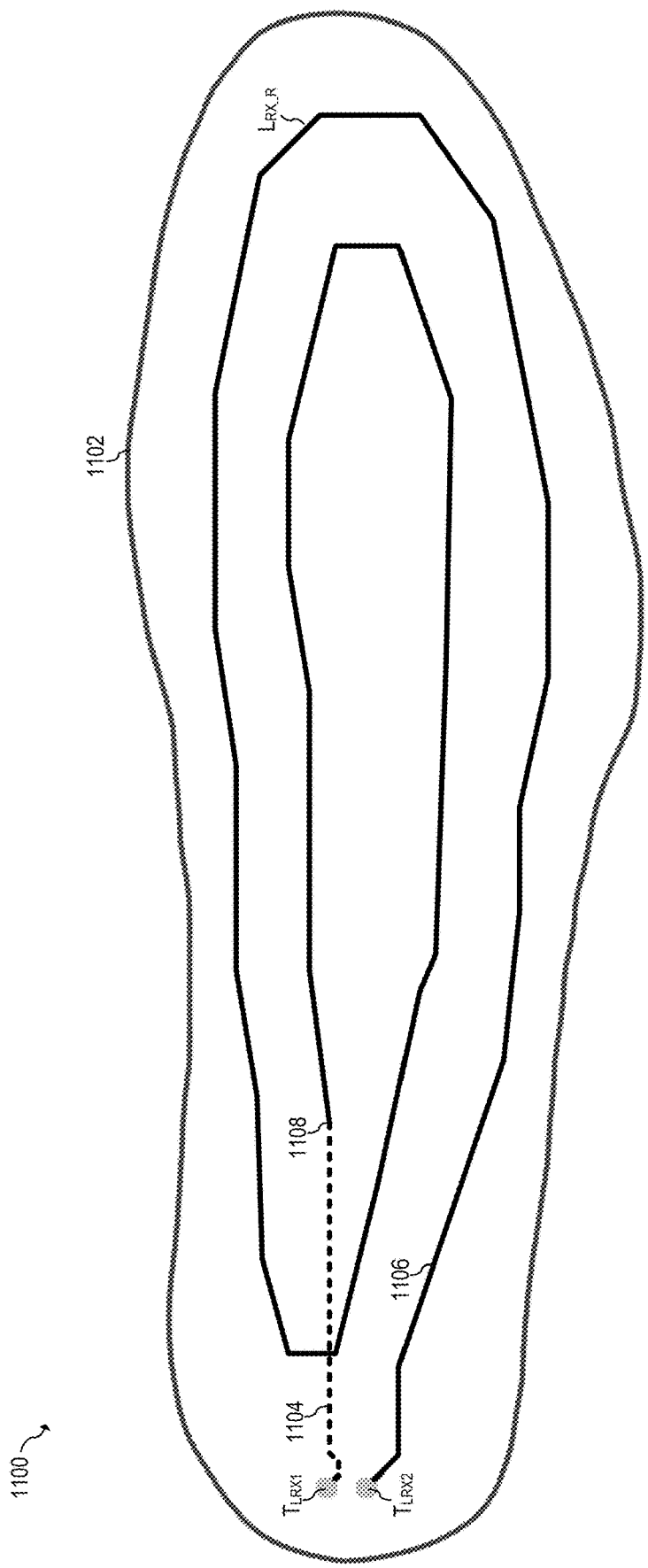
FIGS. 11-14 show possible implementations of a resistive coil implemented in an insole, according to embodiments of the present invention.

FIG. 11 shows insole 1100, according to an embodiment of the present invention. Insole 1100 has edge 1102 and includes terminals $T_{LRX1}$ and $T_{LRX2}$, via 1108, and resistive coil $L_{RX\_R}$. Insole 202 may be implemented as insole 1100.

As shown in FIG. 11, resistive coil $L_{RX\_R}$ includes 2 full turns between terminals $T_{LRX1}$ and $T_{LRX2}$. Some embodiments may include more than 2 full turns, such as 3 or more. Other embodiments may be implemented with 1 full turn.

As shown in FIG. 11, in some embodiments, coil $L_{RX\_R}$ may be implemented using traces, e.g., in a flexible PCB. For example, as shown in FIG. 11, the flexible PCB includes 2 layers, where the trace 1106 (from terminal $T_{LRX2}$ to via 108) is in a first layer (e.g., the top layer facing the foot) and trace 1104 (from terminal $T_{LRX1}$ to via 108) is in a second layer. In some embodiments, the flexible PCB may include more than 2 layers, such as 4 layers or more.

Figure 12:
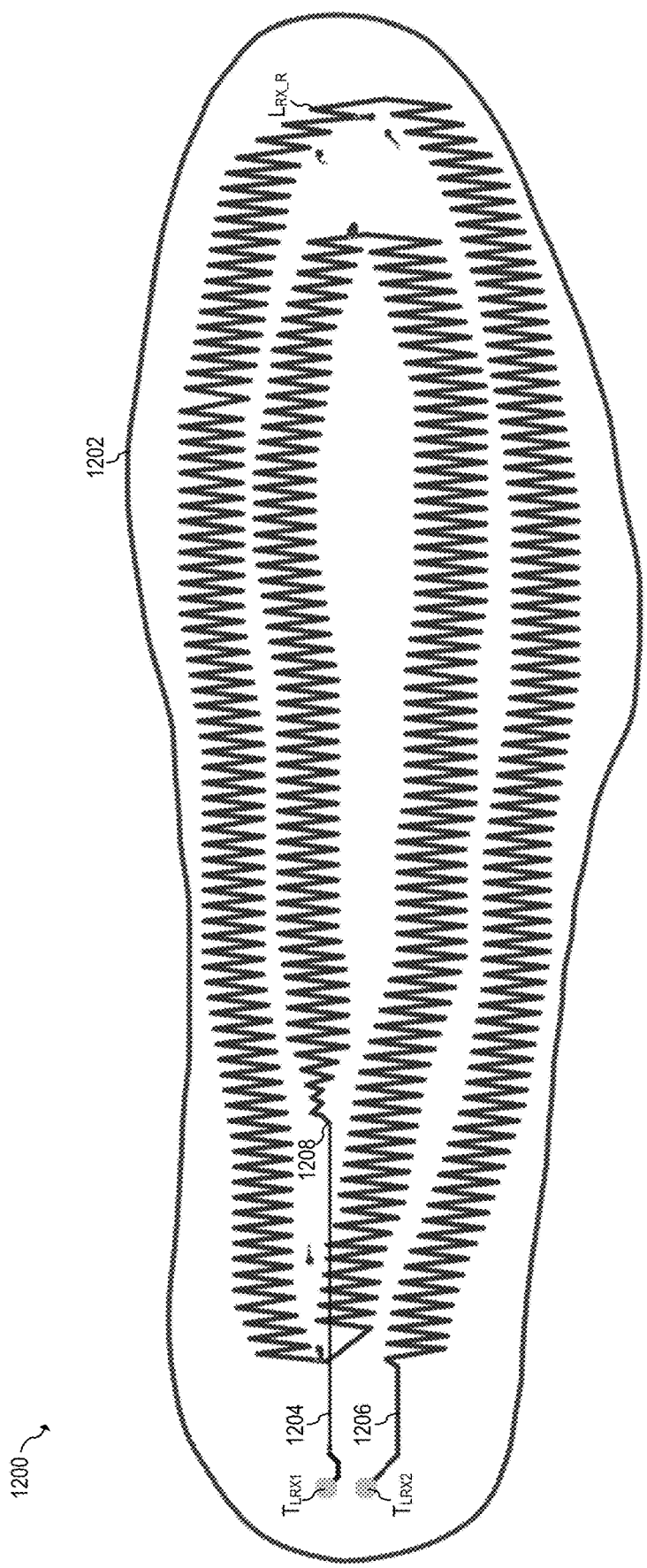

In some embodiments, the traces of resistive coil $L_{RX\_R}$ may have a zig-zag shape. For example, FIG. 12 shows insole 1200 having traces with a zig-zag shape, according to an embodiment of the present invention. Insole 1200 has edge 1202 and includes terminals $T_{LRX1}$ and $T_{LRX2}$, via 1208, and resistive coil $L_{RX\_R}$. Insole 202 may be implemented as insole 1200. As shown in FIG. 12, via 1208 is used to connect trace 1204 (from terminal $T_{LRX1}$ to via 1208) to trace 1206 (from via 1208 to terminal $T_{LRX2}$).

As shown in FIG. 12, resistive coil $L_{RX\_R}$ includes 2 full turns between terminals $T_{LRX1}$ and $T_{LRX2}$. Some embodiments may include more than 2 full turns, such as 3 or more. Other embodiments may be implemented with 1 full turn.

As shown in FIG. 12, in some embodiments, the traces may be implemented with straight lines in a zig-zag manner so as to increase the length of the trace (and thus the associated resistivity $R_{LRX}$) without impacting or substantially impacting the inductance $L_{RX}$. For example, in some embodiments, the length of the traces from terminals $T_{LRX1}$ to $T_{LRX2}$ of insole 1200 may be longer (e.g., more than 4 times longer) than the length of the traces from terminals $T_{LRX1}$ to $T_{LRX2}$ of insole 1100, and the associated resistivity $R_{LRX}$ of insole 1200 may be higher (e.g., more than 4 times) than the resistivity $R_L$RX of insole 1100, e.g., while having the same or similar inductance $L_{RX}$.

In some embodiments, implementing resistive coil $L_{RX\_R}$ using traces with zig-zag advantageously increase the resistance $R_{LRX}$ and covers a larger area of the insole, which may advantageously distribute heat across the insole more evenly, when compared with implementations using traces that result in the same inductance LRX but without the zig-zag.

Figure 13:
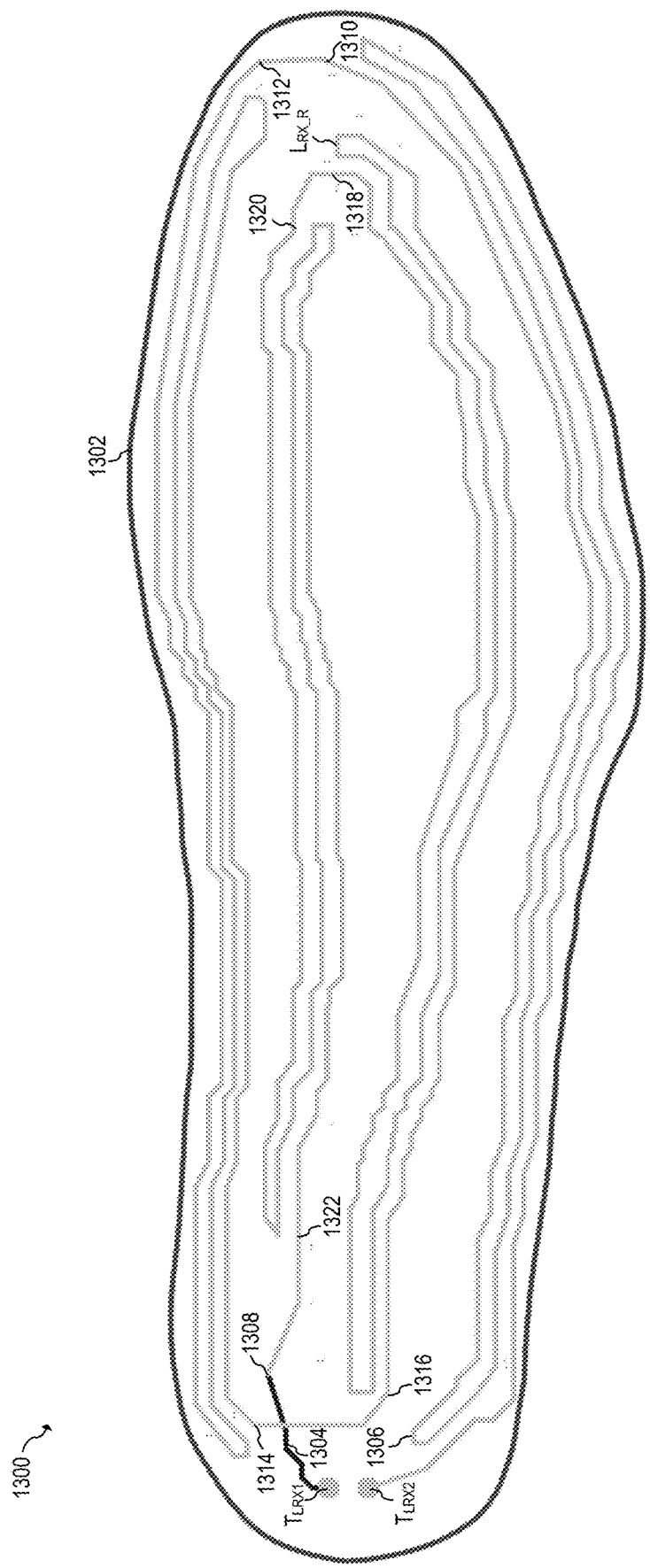

In some embodiments, resistive coil $L_{RX\_R}$ is implemented with traces having a plurality of half-turns that are close to each other so as to minimize the associated cross-sectional area so as to minimize inductance while increasing the associated resistance while using full turns with a bigger cross-sectional area so as to increase the associated inductance. For example, in some embodiments, resistive coil $L_{RX\_R}$ may have the same number of desired full turns (for purposes of achieving a desired inductance LRX), while having a plurality of half-turns formed by a plurality of back and forth traces, e.g., to increase resistance. For example, FIG. 13 shows insole 1300 having traces with half-turns, according to an embodiment of the present invention. Insole 1300 has edge 1302 and includes terminals $T_{LRX1}$ and $T_{LRX2}$, via 1308, and resistive coil $L_{RX\_R}$. Insole 202 may be implemented as insole 1300. As shown in FIG. 13, via 1308 is used to connect trace 1304 (from terminal $T_{LRX1}$ to via 1308) to trace 1306 (from via 1308 to terminal $T_{LRX2}$).

As shown in FIG. 13, resistive coil $L_{RX\_R}$ includes 2 full turns between terminals $T_{LRX1}$ and $T_{LRX2}$. Some embodiments may include more than 2 full turns, such as 3 or more. Other embodiments may be implemented with 1 full turn.

As shown in FIG. 13, there are 2 half-turns between terminal $T_{LRX2}$ and location 1310, 2 half turns between location 1312 and location 1314, 2 half-turns between location 1316 and location 1318, and 2 half-turns between location 1322 and location 1322. Although avoiding such half-turns results in an inductance $L_{RX}$ similar to the inductance achieved with the half-turns, the half-turns may advantageously increase the associated resistance $R_{LRX}$ and thus the associated heat generation capability, as well as increase the area covered by heating elements (the traces) that supply heat to the foot, which may advantageously distribute heat across the insole more evenly when compared with not using the plurality of half-turns.

In some embodiments, the length of the traces from terminals $T_{LRX1}$ to $T_{LRX2}$ of insole 1300 may be longer (e.g., more than 3 times longer) than the length of the traces from terminals $T_{LRX1}$ to $T_{LRX2}$ of insole 1100, and the associated resistivity $R_{LRX}$ of insole 1300 may be higher (e.g., more than 3 times higher) than the resistivity $R_{LRX}$ of insole 1100, e.g., while having the same or similar inductance $L_{RX}$.

In some embodiments, vias may be used to short half-turns, either manually or dynamically, so as to modify the resistance $R_{LRX}$ and thus the heat generation capability of resistive coil $L_{RX\_R}$ without impacting or substantially impacting inductance $L_{RX}$.

Figure 14:
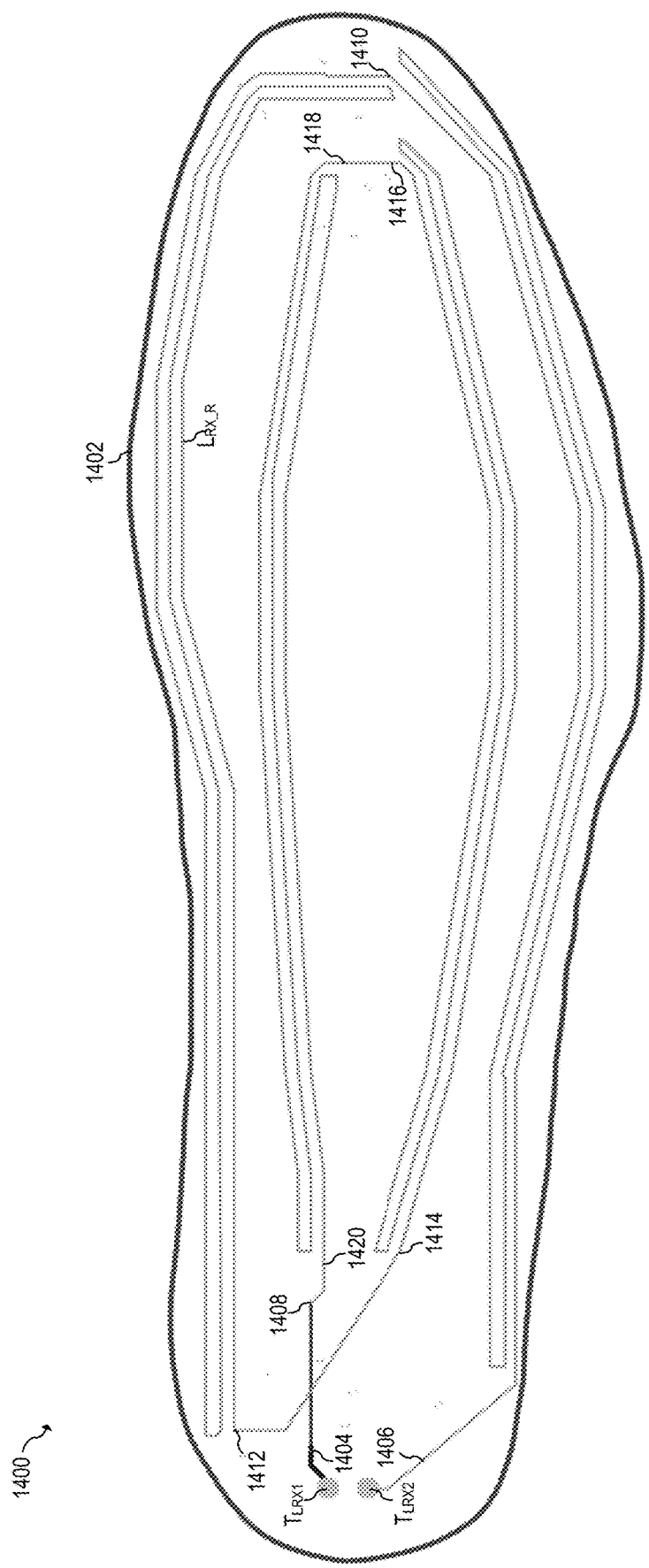

In some embodiments, the width of the traces may be designed for a particular resistance and inductance. For example, FIG. 14 shows insole 1400 having traces with half-turns and a trace width smaller than insole 1300, according to an embodiment of the present invention. Insole 1400 has edge 1402 and includes terminals $T_{LRX1}$ and $T_{LRX2}$, via 1408, and resistive coil $L_{RX\_R}$. Insole 202 may be implemented as insole 1400. As shown in FIG. 14, via 1408 is used to connect trace 1404 (from terminal $T_{LRX1}$ to via 1408) to trace 1406 (from via 1408 to terminal $T_{LRX2}$).

As shown in FIG. 14, resistive coil $L_{RX\_R}$ includes 2 full turns between terminals $T_{LRX1}$ and $T_{LRX2}$. One full turn between terminal $T_{LRX2}$ and location 1414, and the other full turn between location 1414 and terminal $T_{LRX1}$. Some embodiments may include more than 2 full turns, such as 3 or more. Other embodiments may be implemented with 1 full turn.

As shown in FIG. 14, there are 2 half-turns between terminal $T_{LRX2}$ and location 1410, 2 half turns between location 1410 and location 1412, 2 half-turns between location 1414 and location 1416, and 2 half-turns between location 1418 and location 1420. Although the length and arrangement of the traces of insole 1400 is similar to the length and arrangement of insole 1300, the resistance $R_{LRX}$ of resistive coil $L_{RX\_R}$ of insole 1400 is higher than the resistance $R_{LRX}$ of resistive coil $L_{RX\_R}$ of insole 1300 because of its lower width. For example, the width of the traces of insole 1400 is half of the width of the traces of insole 1300. Thus, insole 1400 may be capable of achieving twice the heat generation than insole 1400, with a similar inductance and similar area covered by the resistive coil $L_{RX\_R}$.

In some embodiments, the width of the traces used for implementing resistive coil $L_{RX\_R}$ may be as low as 10 mils or lower. In some embodiments, the width of the traces used for implementing resistive coil $L_{RX\_R}$ may be as high as 350 mils or higher.

In some embodiments, the amount of copper used for the traces may also be adjusted so as to modify the resistivity $R_{LRX}$ and current carrying capability of the traces without modifying or substantially modifying the inductance $L_{RX}$. For example, some embodiments may implement traces with a thickness of 2 oz/ft$^2$. Thicker traces or thinner traces may also be used.

In some embodiments, the traces of resistive coil $L_{RX\_R}$ may implement zig-zag, one or more half-turns, various trace widths and/or various trace thicknesses so as to achieve a desired resistance $R_{LRX}$, a desired inductance $L_{RX}$, a desired current carrying capability, and/or a desired heat distribution pattern.

Example embodiments of the present invention are summarized here. Other embodiments can also be understood from the entirety of the specification and the claims filed herein.

Example 1. A method for heating a personal device using a wirelessly-powered heating device, the method including: wirelessly receiving power with a receiving coil of the wirelessly-powered heating device, the receiving coil located inside the personal device, where the receiving coil is coupled to a capacitor of the wirelessly-powered heating device to form a receiver resonant tank; and heating the personal device with heat produced by a resistance of the receiving coil, where the receiving coil functions as a receiver antenna and as a heat producing element.

Example 2. The method of example 1, where the personal device is a shoe, and where the receiving coil is located in a sole of the shoe.

Example 3. The method of one of examples 1 or 2, where the sole of the shoe does not include a ferrite core.

Example 4. The method of one of examples 1 to 3, where the sole of the shoe is flexible.

Example 5. The method of one of examples 1 to 4, where the sole is removable from the shoe.

Example 6. The method of one of examples 1 to 5, further including wirelessly transmitting power to the receiving coil with a resonant wireless power transmitter.

Example 7. The method of one of examples 1 to 6, further including communicating, from the wirelessly-powered heating device to the resonant wireless power transmitter, using in-band communication by modulating a current flowing through the receiver resonant tank.

Example 8. The method of one of examples 1 to 7, further including communicating, from the resonant wireless power transmitter to the wirelessly-powered heating device, using Bluetooth or WiFi.

Example 9. The method of one of examples 1 to 8, where the resonant wireless power transmitter is located in a mat.

Example 10. The method of one of examples 1 to 9, further including communicating, from the wirelessly-powered heating device to other device, using Bluetooth or WiFi.

Example 11. The method of one of examples 1 to 10, where the other device includes another personal device including another wirelessly-powered heating device, the method further including: wirelessly receiving power with another receiving coil of the another wirelessly-powered heating device; and heating the other device with heat produced by another resistance of another receiving coil.

Example 12. The method of one of examples 1 to 11, where the personal device is a left shoe and the other device is a right shoe.

Example 13. The method of one of examples 1 to 12, where wirelessly receiving power includes wirelessly receiving power at a frequency of about 6.78 MHz.

Example 14. The method of one of examples 1 to 13, where the resistance of the receiving coil has a value between 1 E and 7.5Ω.

Example 15. The method of one of examples 1 to 14, where the receiving coil includes iron, chromium, and aluminum.

Example 16. The method of one of examples 1 to 15, where the receiving coil has a first terminal directly connected to a first terminal of the capacitor, and a second terminal directly connected to a second terminal of the capacitor.

Example 17. The method of one of examples 1 to 16, where the wirelessly-powered heating device further includes a bridge rectifier having a first terminal directly connected to the first terminal of the receiving coil and a second terminal directly connected to the second terminal of the receiving coil, and a controller coupled to the bridge rectifier.

Example 18. The method of one of examples 1 to 17, further including regulating a temperature of the personal device based on a temperature sensor coupled to the controller.

Example 19. The method of one of examples 1 to 18, further including adjusting a capacitance of the capacitor to regulate the temperature of the personal device.

Example 20. The method of one of examples 1 to 19, where the capacitor includes a capacitor bank, and where adjusting the capacitance of the capacitor includes connecting or disconnecting one or more capacitors of the capacitor bank to the receiving coil.

Example 21. The method of one of examples 1 to 20, where adjusting the capacitance of the capacitor includes adjusting the capacitance of the capacitor at a frequency lower than 1 kHz.

Example 22. The method of one of examples 1 to 21, where the receiving coil produces at least 90% of the heat produced by the wirelessly-powered heating device.

Example 23. The method of one of examples 1 to 22, further including increasing a temperature of a surface of the personal device by at least 5° C. with heat produced by the resistance of the receiving coil.

Example 24. A shoe including: a sole; and a heating device configured to heat the shoe, the heating device including a resonant tank that includes a capacitor and a receiving coil, where the receiving coil is configured to function as a receiver antenna and as a heat producing element.

Example 25. The shoe of example 24, where the sole is an insole, and where the insole includes the heating device.

Example 26. The shoe of one of examples 24 or 25, where the receiving coil includes traces with a plurality of half-turns.

Example 27. The shoe of one of examples 24 to 26, where the receiving coil includes traces with a zig-zag pattern.

Example 28. A personal device including: fabric that surrounds or partially surrounds the personal device; and a heating device including: a capacitor, and a receiving coil coupled to the capacitor to form a resonant tank, where the receiving coil is configured to function as a receiver antenna and as a heat producing element.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for heating a personal device, the method comprising:
   wirelessly receiving, by a receiving coil of a wirelessly-powered heating device, power, the receiving coil being located inside the personal device, wherein the receiving coil is coupled to a capacitor of the wirelessly-powered heating device to form a receiver resonant tank;
   heating the personal device with heat produced by a resistance of the receiving coil, wherein the receiving coil functions as a receiver antenna and as a heat producing element; and
   wirelessly communicating, by the wirelessly-powered heating device, with another device, wherein the other device is a device different than a device comprising a resonant wireless power transmitter.

2. The method of claim 1, wherein the personal device is a shoe, and wherein the receiving coil is located in a sole of the shoe.

3. The method of claim 2, wherein the sole of the shoe does not comprise a ferrite core.

4. The method of claim 2, wherein the sole of the shoe is flexible.

5. The method of claim 2, wherein the sole is removable from the shoe.

6. The method of claim 1, further comprising wirelessly transmitting power to the receiving coil with the resonant wireless power transmitter.

7. The method of claim 6, further comprising communicating, from the wirelessly-powered heating device to the resonant wireless power transmitter, using in-band communication by modulating a current flowing through the receiver resonant tank.

8. The method of claim 6, further comprising communicating, from the resonant wireless power transmitter to the wirelessly-powered heating device, using Bluetooth or WiFi.

9. The method of claim 8, wherein the resonant wireless power transmitter is located in a mat.

10. The method of claim 1, wherein the other device comprises another personal device comprising another wirelessly-powered heating device, the method further comprising:
    wirelessly receiving power with another receiving coil of the other wirelessly-powered heating device; and
    heating the other device with heat produced by another resistance of the other receiving coil.

11. The method of claim 10, wherein the personal device is a left shoe and the other device is a right shoe.

12. The method of claim 1, wherein wirelessly receiving power comprises wirelessly receiving power at a frequency of about 6.78 MHz.

13. The method of claim 1, wherein the resistance of the receiving coil has a value between 1Ω and 7.5Ω.

14. The method of claim 1, wherein the receiving coil comprises iron, chromium, and aluminum.

15. The method of claim 1, wherein the receiving coil has a first terminal directly connected to a first terminal of the capacitor, and a second terminal directly connected to a second terminal of the capacitor.

16. The method of claim 15, wherein the wirelessly-powered heating device further comprises a bridge rectifier having a first terminal directly connected to the first terminal of the receiving coil and a second terminal directly connected to the second terminal of the receiving coil, and a controller coupled to the bridge rectifier.

17. The method of claim 16, further comprising regulating a temperature of the personal device based on a temperature sensor coupled to the controller.

18. The method of claim 17, further comprising adjusting a capacitance of the capacitor to regulate the temperature of the personal device.

19. The method of claim 18, wherein the capacitor comprises a capacitor bank, and wherein adjusting the capacitance of the capacitor comprises connecting or disconnecting one or more capacitors of the capacitor bank to the receiving coil.

20. The method of claim 18, wherein adjusting the capacitance of the capacitor comprises adjusting the capacitance of the capacitor at a frequency lower than 1 kHz.

21. The method of claim 1, wherein the receiving coil produces at least 90% of the heat produced by the wirelessly-powered heating device.

22. The method of claim 1, further comprising increasing a temperature of a surface of the personal device by at least 5° C. with heat produced by the resistance of the receiving coil.

23. A method for heating a personal device, the method comprising:
wirelessly receiving power with a receiving coil of a wirelessly-powered heating device, the receiving coil located inside the personal device, wherein the receiving coil is coupled to a capacitor of the wirelessly-powered heating device to form a receiver resonant tank; and
heating the personal device with heat produced by a resistance of the receiving coil, wherein the receiving coil functions as a receiver antenna and as a heat producing element,
wherein the wirelessly-powered heating device comprises a bridge rectifier having a first terminal connected to the first terminal of the receiving coil and a second terminal connected to the second terminal of the receiving coil, and a controller coupled to the bridge rectifier.

24. The method of claim 23, further comprising regulating a temperature of the personal device based on a temperature sensor coupled to the controller.

25. The method of claim 24, further comprising adjusting a capacitance of the capacitor to regulate the temperature of the personal device.

26. The method of claim 25, wherein the capacitor comprises a capacitor bank, and wherein adjusting the capacitance of the capacitor comprises connecting or disconnecting one or more capacitors of the capacitor bank to the receiving coil.

27. The method of claim 25, wherein adjusting the capacitance of the capacitor comprises adjusting the capacitance of the capacitor at a frequency lower than 1 kHz.

28. A method for heating a personal device, the method comprising:
wirelessly receiving power with a receiving coil of a wirelessly-powered heating device, the receiving coil located inside the personal device, wherein the receiving coil is coupled to a capacitor of the wirelessly-powered heating device to form a receiver resonant tank;
heating the personal device with heat produced by a resistance of the receiving coil, wherein the receiving coil functions as a receiver antenna and as a heat producing element; and
communicating, from the wirelessly-powered heating device to another device, using Bluetooth or WiFi.

* * * * *